United States Patent
Orlowski

[15] 3,678,976
[45] July 25, 1972

[54] ONION PEELING APPARATUS

[72] Inventor: Gerald J. Orlowski, Calumet Park, Ill.

[73] Assignee: Korlow Corporation

[22] Filed: June 19, 1970

[21] Appl. No.: 47,763

[52] U.S. Cl. .................................................146/43 R, 146/83
[51] Int. Cl. ................................................................A23n 7/00
[58] Field of Search..................146/83, 43 R, 43 A, 230, 241

[56] References Cited

UNITED STATES PATENTS 3,485,279  12/1969  Parsons...............................146/43 X
3,402,748   9/1968  Olney..................................146/83 X

*Primary Examiner*—Willie G. Abercrombie
*Attorney*—Molinare, Allegretti, Newitt & Witcoff

[57] ABSTRACT

An apparatus for peeling onions. A rotating inlet conveyor is provided for introducing whole onions with their skin, and flower and root portions thereon to cutters which remove the flower and root portions end from each onion. Means then transfer the onion to a rotary member which simultaneously conveys the onions to a discharge point and peels them. During the transfer from the inlet conveyor to the conveying-peeling means, the outer peripheries of the onions are scribed to a limited depth of penetration. When the onion is transferred to the conveying means, pressurized air is directed against the scribed outer periphery of the onion to force the skin from the outer surface of the onion. The severed and peeled onion is finally transferred to a discharge station for further processing.

17 Claims, 7 Drawing Figures

Inventor:
Gerald J. Orlowski
By Molinare, Allegretti,
Newitt & Witcoff
Attys

Patented July 25, 1972

Inventor:
Gerald J. Orlowski
By Molinare, Allegretti,
Newitt & Witcoff  Attys

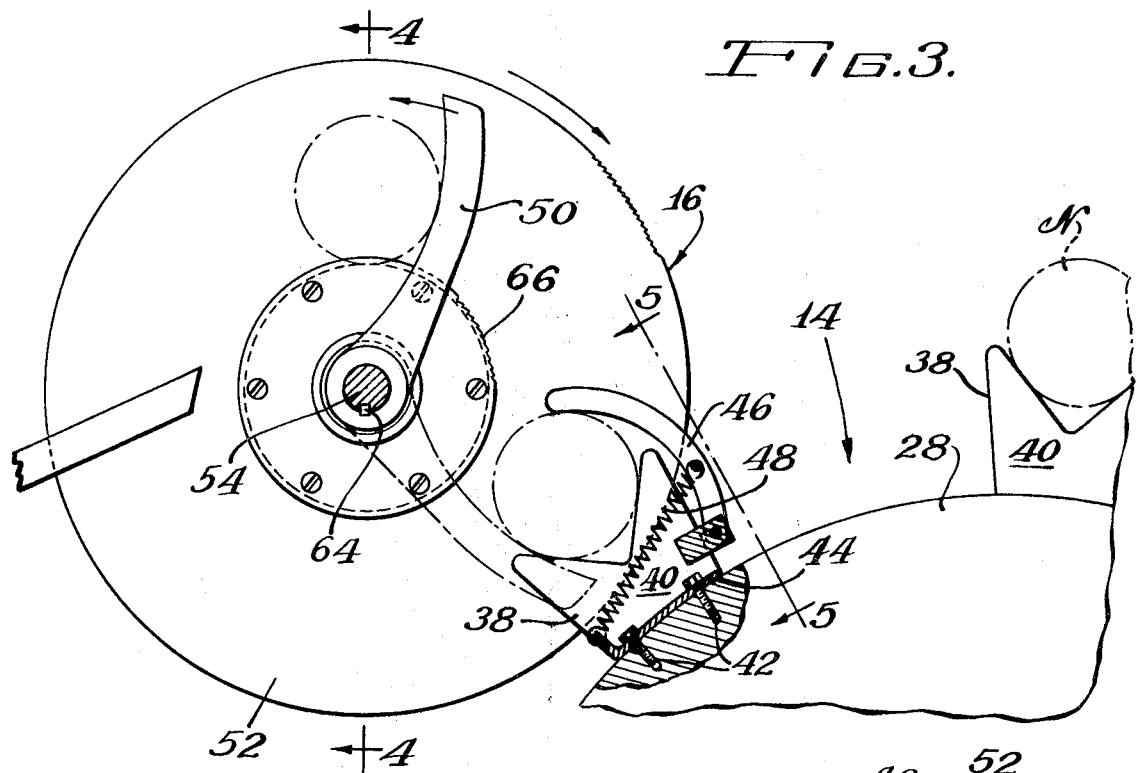
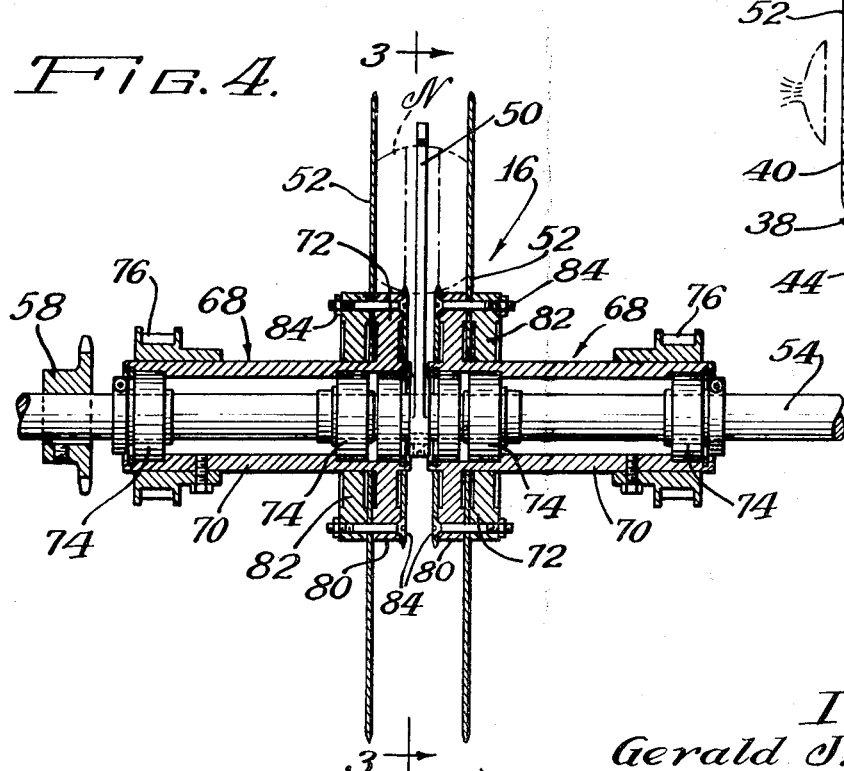

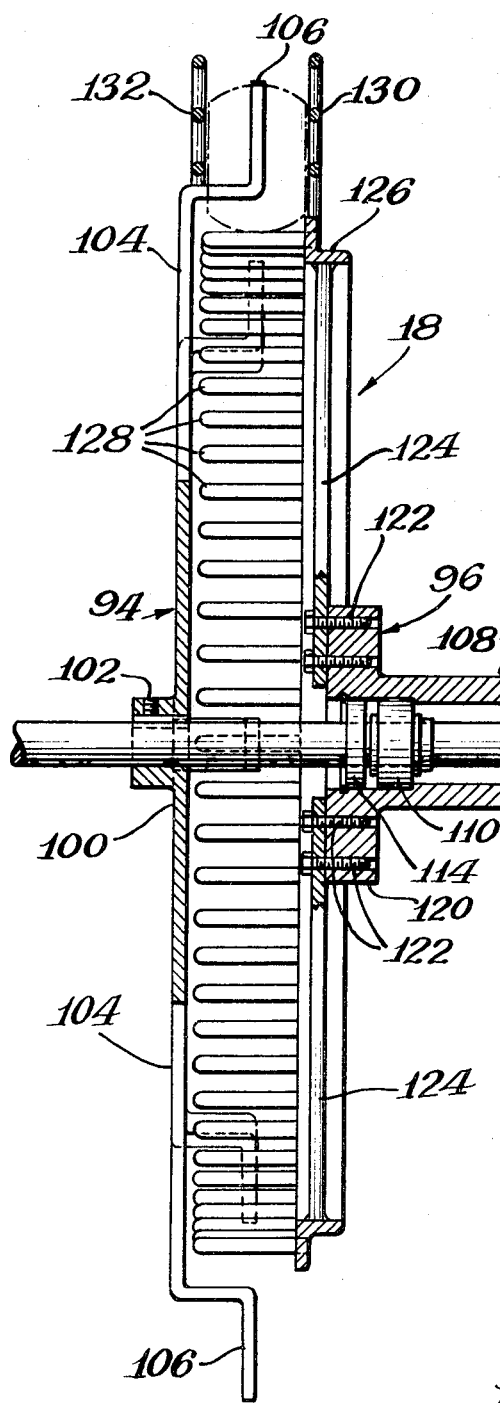
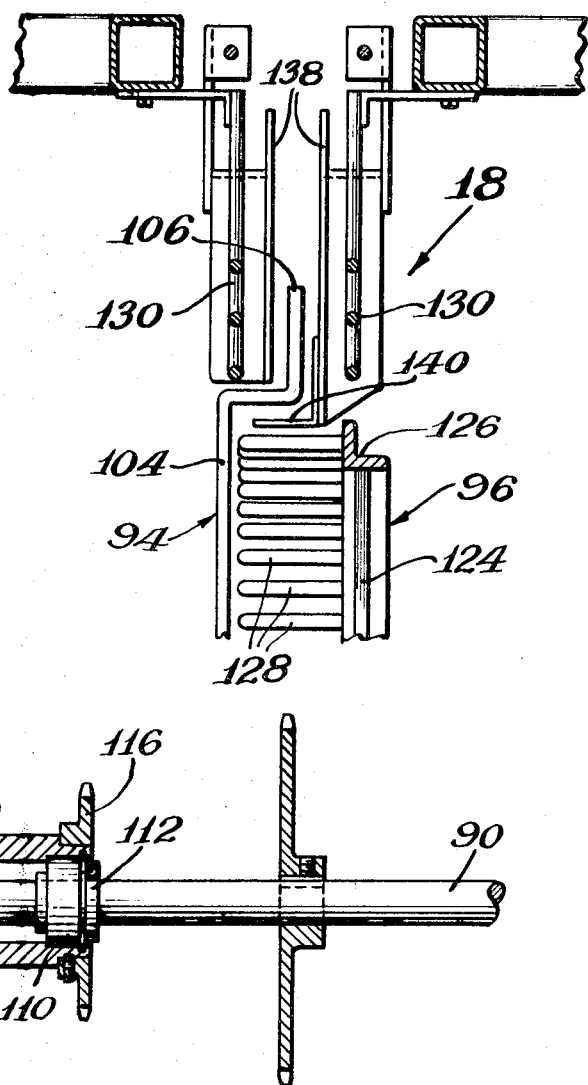

3,678,976

ONION PEELING APPARATUS

BACKGROUND OF THE INVENTION

FIELD OF THE INVENTION

DESCRIPTION OF THE PRIOR ART

This invention relates to improved apparatus for cutting the flower and root portions of an onion and for thereafter removing the outer skin or peel therefrom.

In the processing of food products, it is highly desirable from the standpoint of economics to carry out the major portion of the processing with mechanical equipment in order to avoid the necessity of tedious and expensive manual labor. The processing of food products from their natural state with automatic equipment is particularly difficult because of the wide variation in the size and shape of food products, such as fruits and vegetables. One food product which is particularly difficult to process in a highly efficient, economical manner, is the processing of onions for making onion rings.

In the processing of onions for onion rings, it is first necessary to sever the flower and root portions from the onion, peel the onion and then slice the onion to the desired thickness prior to separation into rings. In such processing, it is quite difficult to initially begin the processing of the onions from the natural state because of the wide variation in size and shape. Although equipment has been known for removing the flower and root portions from onions for peeling them, such equipment has not proven to be as effective from the operational and economical standpoint as desired.

SUMMARY OF THE INVENTION

It is therefore an important object of this invention to provide an improved apparatus for processing onions from their natural state until they are ready for slicing.

It is also an object of this invention to provide an improved apparatus for severing the flower and root portions from an onion, providing an onion section of preselected thickness and then peeling the same.

It is another object of this invention to provide an apparatus which is highly effective and economical in processing raw, natural state onions by severing the flower and root portions therefrom and by removing the peels so that the onions are ready for slicing to predetermined thicknesses.

It is yet another object of this invention to provide apparatus for severing the opposite ends from an onion and peeling the same wherein the apparatus continuously moves the onion during processing with generally a series of rotary movements.

It is yet another object of this invention to provide an onion processing apparatus for processing a natural state onion to a processed onion of preselected thickness, ready for slicing.

Further purposes and objects of this invention will appear as the specification proceeds.

The foregoing objects are accomplished by providing an apparatus for peeling a plurality of onions having their flower and root portions and peels thereon, wherein the apparatus includes an inlet conveyor for the onion, cutters on the frame for peeling the onions while transferring the onions to the discharge section, scribe cells on the frame for severing the onion to a preselected depth of penetration to facilitate peeling of the onions, and transfer means for moving the onion from the cutter section to the peeling and conveying section as the scribing operation is performed on the onion.

BRIEF DESCRIPTION OF THE DRAWINGS

A particular embodiment of the present invention is illustrated in the accompanying drawings wherein:

FIG. 3 is a cross-sectional view taken along the line 3—3 of FIG. 4 showing an enlarged, detailed section of a portion of the inlet conveyor as the onion is being transferred to the end severing section of the conveyor;

FIG. 4 is a cross-sectional view taken along the line 4—4 of FIG. 3;

FIG. 5 is a detailed cross-sectional view taken along the line 5—5 of FIG. 3;

FIG. 6 is an enlarged sectional view taken along the line 6—6 of FIG. 1, showing the peeling section of the conveyor used for transferring the onions from the end severing section to the discharge section; and FIG. 7 is an enlarged sectional view taken along the line 7—7 of FIG. 1.

DETAILED DESCRIPTION OF THE PREFERRED EMBODIMENT

Figure 1:
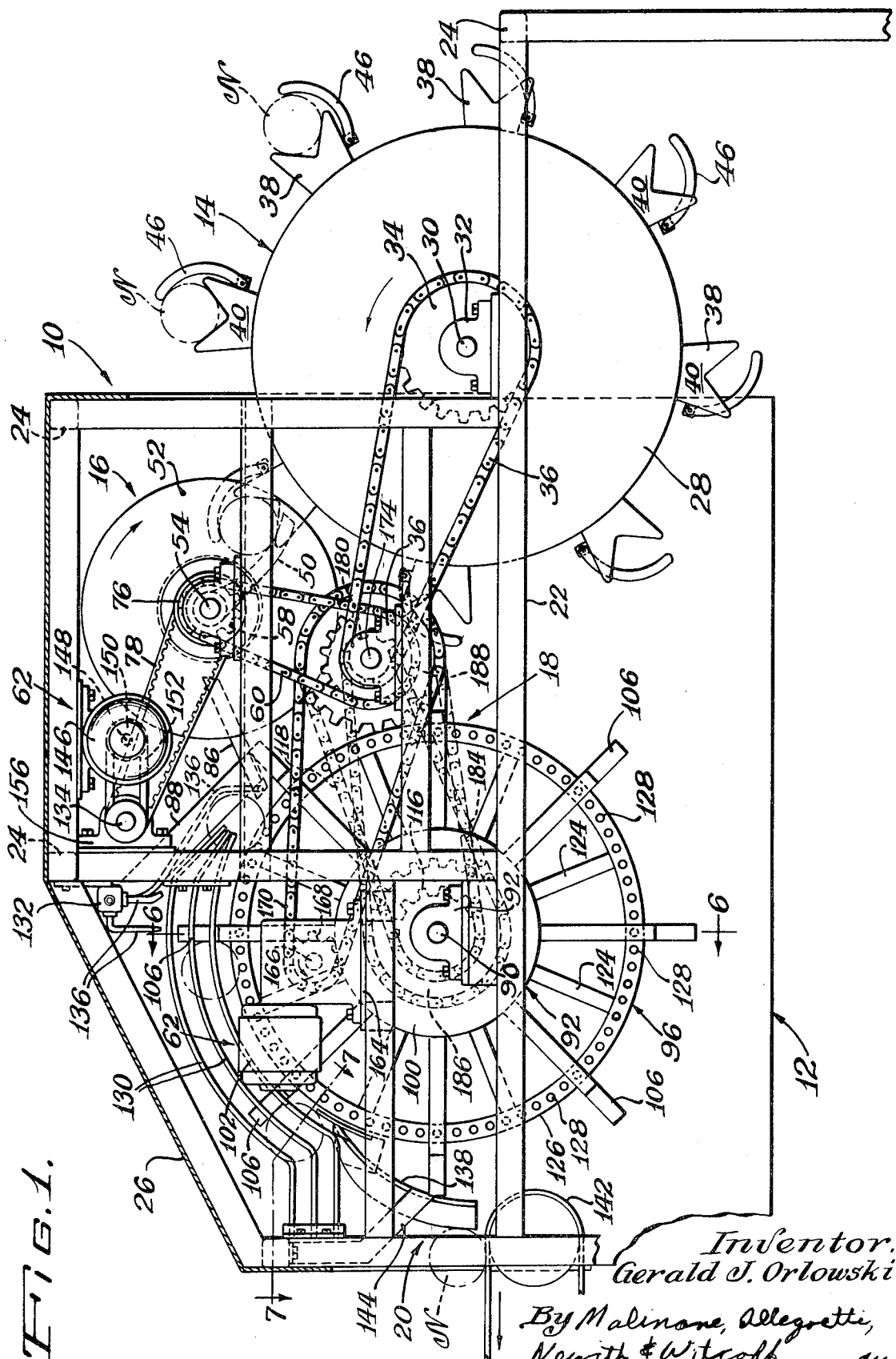
FIG. 1 is a side elevational view of my apparatus for processing onions wherein the inlet section, transfer-scribing section, peeling section and the discharge section are illustrated.
Figure 2:
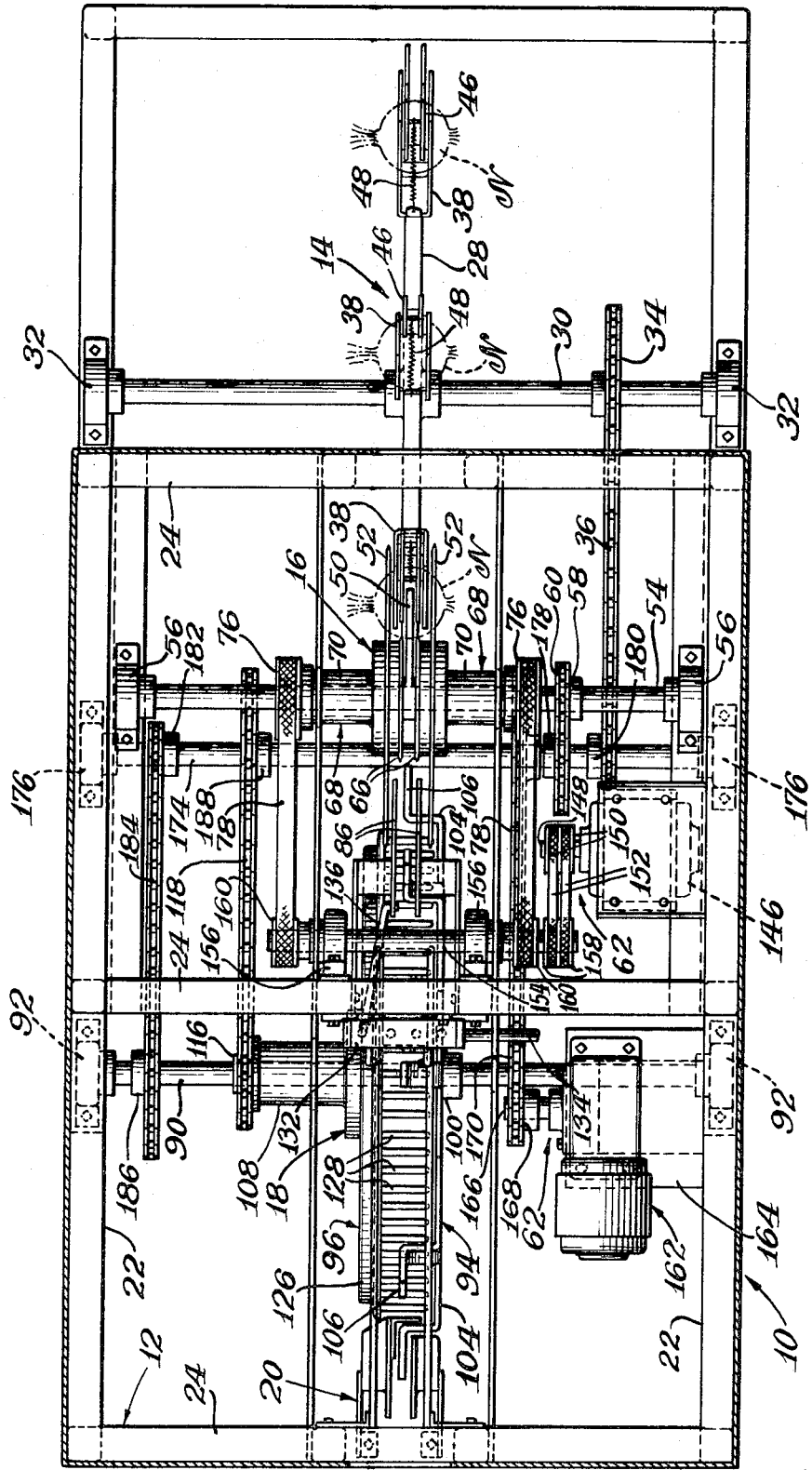
FIG. 2 is a top plan view of the embodiment of FIG. 1 with the cover removed.

Referring to the drawings, particularly FIGS. 1 and 2, an onion peeling apparatus, generally 10, includes a frame generally 12, an inlet section, generally 14, a cutter and transfer section, generally 16, a peeling section, generally 18, and an outlet or discharge section, generally 20.

The frame 12 includes a pair of side frame weldments 22, with a plurality of cross support members 24 rigidly interconnecting the side frames 22. A cover sheet 26 is provided for enclosing the operating section of the apparatus 10.

Referring particularly to FIGS. 1–3, the inlet section 14 is shown in detail. The inlet section 14 generally includes a rotary load wheel 28, which as viewed in FIG. 1, is rotated in a generally counterclockwise direction, so as to receive onions, designated by the letter N shown in phantom view, from the intake section 14 to the processing portions of the apparatus 10. The load wheel 28 is rigidly mounted upon a driven shaft 30 which is rotatably carried in a pair of pillow blocks 32 which are mounted on each of the side frames 22. A drive sprocket 34 is rigidly mounted on the driven shaft 30 and operatively engages a drive chain 36. As will be described hereinafter, the drive shaft 30 and load wheel 28 are rotated in timed sequence or synchronization with the remaining processing sections of the apparatus 10.

A plurality of product receiving elements 38, such as eight, are rigidly mounted on the outer periphery of the wheel 28. The product receiving elements 38 project radially from the outer periphery of the wheel 28, and positively engage the onions N. The product receiving elements 38, as shown best in FIGS. 3 and 5, each comprise a unitary member having a pair of spaced V-notched walls 40 which receive the onions N in therein. Screws 42 pass through suitable apertures in the unitary base 44 and secure the product receiving elements 38 to the load wheel 28.

As shown in FIGS. 3 and 5, a curved finger 46 is pivotally secured to one of the upstanding V-walls 40 and spring member 48 biases the curved finger 46 inwardly so as to positively engage an onion N between one of the fingers 46 and the V-notched walls 30. The bias of the spring 48 is sufficient to firmly and positively hold the onion N in place while at the same time not damage the onion. An operator manually inserts the onion ends into the V-notched wall 30 by retracing the curved finger 46 against the bias of the spring 48 and then inserting the onion N therein.

Referring particularly to FIGS. 1, 2, 3, and 4, the cutter and transfer section 16 may be seen in detail. Although the rotary transfer arm 50 and the rotary saw blades 52 are coaxial with each other as shown best in FIG. 3, the direction of rotation of the arms 50 and the blades 52 are opposite. The saw blades 52 rotate, as viewed in FIG. 3, in a clockwise direction, while the load wheel 28 and rotary transfer arm 50 rotate in a counterclockwise direction.

A central rotating shaft 54 is rotatably carried in a pair of pillow blocks 56 rigidly mounted to the side frames 22 of the frame 12. A sprocket 58 is securely mounted upon the central shaft 54 and engages a drive chain 60. As will be described hereinafter, the drive chain 60 as well as the drive chain 36 are driven by the drive mechanism, generally 62, which will be hereinafter described in greater detail.

The rotary transfer arm 50 is rigidly secured to the central portion of the central shaft 54, as by means of a key connection 64, shown in FIG. 3. In the embodiment shown, only one rotary transfer arm 50 is used requiring the shaft 54 to rotate at a rotary speed which is eight times the rotary speed of the load wheel 28. The rotary transfer arm 50 is synchronized to engage an onion carried on one of the product receiving elements 38, as seen in FIGS. 1 and 3, after the root and flower portions of the onion N have been severed therefrom by the pair of spaced rotary saw blades 52. The central portion of the onion N is confined between the saw blades 52 while the rotary transfer arm 50 rotates the severed onion section to the peeling section 18, simultaneously with which a pair of spaced scribe blades 66 penetrate the outer skin of the onion to a preselected depth.

A pair of separate, similarly constructed saw blade assemblies 68 support both the severing saw blades 52 and the scribe blades 66. Each of the saw blade assemblies 68, as shown best in FIG. 4, includes an elongated central hub portion 70 having an annular flanged end 72. The central portion of the hub 70 has an axial base which is mounted around and supported by the central shaft 54. The hub portion 70 is spaced from the central shaft 54 by pairs of spaced bearings 74 which are rigidly secured at the opposite inner ends of the hub portion 70 and which rotatably support the hubs 70 relative to the rotatable central shaft 54. The end of the hub 70 opposite the annular flange 72 includes a timing belt gear 76 arranged to receive a timing belt 78. The belt rotates the saw blade assembly 68 at the desired rotary speed. The timing belts 78 are interconnected to the drive mechanism 62 to be hereinafter described in greater detail.

The outer end of the annular flange 72 has a scribe blade 66 mounted thereon. The outer edge of the scribe blade 66 extends slightly beyond the cylindrical edge 80 defined by the annular flange 72. The distance that the scribe blade 66 extends beyond the cylindrical edge 80 determines the depth of the scribe for the outer skin of the onion N.

The large rotary saw blade 52 is mounted on the hub portion 70 against the inner end of the annular flange 72. An annular clamping member 82 is received on the hub portion 70 and the saw blade 52 is rigidly held in place between the annular flange 72 and the clamping member 82. A plurality of fasteners, such as screws and nuts, are passed through the scribe blades 66, the annular flange 72, the saw blades 52 and the clamping member 82 in order to rigidly hold the saw blades 52 and 66 firmly in place. The diameter of the saw blade 52 is substantially greater than the diameter of the scribe blade 66 since the saw blades 52 completely sever the flower and root portions from the onion N while the scribe saws merely cut the onion N to facilitate peeling. Furthermore, the saw blades 52 serve the further function of maintaining appropriate alignment for the onions N as the rotary transfer arm 50 transfers the onion N to the peeling section 18 as the skin of the onion is scribed by the blades 66.

Referring to FIGS. 1, 2, 6, and 7, the details of the peeling section 18 are shown. The severed and scribed onions N are intercepted by the stationary rails 86 which extend into the space between the rotary saw blades 52. The rotary transfer arm 50 passes between the ends of the stationary discharge rails 86, which are secured to the chain frame 12 by support bars 88.

A rotary shaft 90 is rotatably mounted on pillow blocks 92 which are mounted on each of the side frames 22 of the machine frame 12. The peeling section 18 includes a rotary paddle blade assembly 94 and a rotary squirrel cage assembly 96. Both the squirrel cage 96 and the paddle blade assembly 94 are rotated in the same direction, a counterclockwise direction, as seen in FIG. 1.

The paddle blade assembly 94 includes a hub 100 which is fixedly secured to the rotary shaft 90, as by a set screw 102. The hub 100 includes a plurality of radially extending arms 100, such as eight, which are equiangularly spaced from each other. The outer ends of the arms 104 each include an inwardly offset portion 106 which, as seen best in FIG. 6, is provided to engage an onion N as it passes from the cutting and transfer section 16 to the peeling section 18. The offset portions 106 of the arms 104, as they rotate in a rotary direction toward the discharge section 20, act to transfer the onions N simultaneously with the peeling thereof.

The squirrel cage assembly 96 includes a support portion or a hub portion 108 having a central bore with a pair of bearing members 110 securely mounted therein. A locking collar 112 is mounted on the outer end of the hub portion 108 to lock the squirrel cage assembly 96 in place on the shaft 90. A seal 114 is provided exterior of the inner of the bearings 110. The bearings 110 rotatably support the squirrel cage 96 relative to the rotary shaft 90. The paddle blade assembly 94 moves at a lower rate of rotary speed than the squirrel cage assembly 96, for reasons hereinafter to become apparent. The outer end of the squirrel cage hub portion 108 has a sprocket 116 mounted thereon. The sprocket 116 engages a chain 118 which interconnects to the drive mechanism 62. An annular central portion 120 is securely mounted on the annular outer end of the hub portion 108 by bolts 122. A plurality of radially extending spokes 124 extend from the annular central portion 128 and interengage with an outer circular rim 126. A plurality of closely spaced, parallel pins 128 extend inwardly from the flanged portion of the rim 126.

The function of the substantially cylindrical surface defined by the pins 128 is to effect rotary movement of the onions N themselves as they are moved from the cutting and transfer section 16 to the discharge section 20 by the paddle blade assembly 94. The rotary movement imparted to the onions N facilitates the peeling of the outer skin of the onions N by pressurized air, imparted to the outer surface thereof during the rotary movement. The offset portions 106 of the arms 104 are located approximately centrally of the pins 128. The squirrel cage 96 rotates at a substantially higher rate of speed than the paddle blade assembly 94 in order to provide the desired rotary movement to the onion N.

A pair of side rails, 130, are mounted on the machine frame 12 radially outwardly of the pins 128 of the squirrel cage 96. The side rails 130 maintain the onion N in place during the peeling operation as the onions N are received by the squirrel cage 96, and as they are moved to the discharge section 20. The side rails 130 extend for approximately 90° of the circumference of the squirrel cage 96, from the cutting section 18 to the discharge section 20.

A compressed air manifold 132 is mounted to a frame cross support 24 and a compressed air line 134, extending from a source of pressurized air (not shown) is interconnected to the manifold 132. A plurality of air outlet tubes 136 extend from the manifold 132 and terminate with nozzles which are directed against the outer periphery or skin of the onion N as it moves in its path of travel from the cutting section 16 to the discharge section 20. Since the onion outer periphery has been circumferentially severed by the pair of scribe blades 66, the skin, as it reaches the peeling section 18 is in three separate sections. The pressurized air acting against the onions N, combined with the rotary movement of the onions, forces the severed outer layers of the skin of the onions N therefrom, resulting in the desired peeling of the onions. This peeling is accomplished during the relatively short path of travel of the onions N as they are carried to the discharge section by the paddle wheel assembly 94. A pair of discharge rails 138 are provided at the discharge section 20 for intercepting the onions N from their position on the periphery of the squirrel cage 96. One of the discharge rails 138 includes a bottom rail 140 which engages an onion N as it is moved down the discharge rail 138 to a take-off conveyor 142. The discharge rails 138 are securely mounted to the machine frame 12 by suitable support arms 144.

The drive mechanism is seen best in FIGS. 1 and 2. The drive mechanism 62 includes a first drive motor 146 which is mounted on the frame 12 at its upper central portion. The drive motor 146 has an output shaft 148 which has a pair of pulleys 150 which operatively engage a pair of belts 152. A jack shaft 154 is rotatably mounted on a pair of pillow blocks 156 which are rigidly mounted on the central of the cross supports 24 of the frame 12. A pair of pulleys 158 are mounted on the outer end of the jack shaft 154 and engage the drive belts 152. The jack shaft 154 is thus rotated. A pair of timing belt gears 160 are fixedly secured to the jack shaft 154. Each of the timing belt gears 160 engage a timing belt 78 which drives a saw blade assembly 68, as previously described.

All of the remaining operating parts of the apparatus 10 are operatively driven by a motor-gear reducer set 162. The separate drive motor 146 for the saw blade assembly 168 is preferably used because the saw blade assembly rotates in a direction opposite that of all other rotating parts of the machine. The motor gear reducer 162 is rigidly mounted on a support plate 164 which is fixed to one of the side frames 22 of the frame 12. The output shaft 166 of the motor-gear reducer 162 has a sprocket 168 securely mounted thereon. The sprocket 168 engages a drive chain 170, which in turn, engages a sprocket 172 which is rigidly secured to the central drive shaft 174. The central drive shaft is rotatably carried in a pair of pillow blocks 176 which are mounted on the side frames 22 of the machine frame 12. A drive sprocket 178 is mounted on the central drive shaft 174 and engages the drive chain 60 which engages the sprocket 58 on the central shaft 54 which rotates the rotary transfer arm 50 in a counterclockwise direction, as previously described.

Sprocket 180 is also securely mounted on the central drive shaft 174 and engages the drive chain 36 which engages the drive sprocket 34, mounted on the shaft 30 of the load wheel assembly 28. The central drive shaft 174 also has a sprocket 182 mounted at its outer end which engages a drive chain 184 which, in turn, engages the sprocket 186 mounted on the rotary shaft 90 which operates the paddle blade assembly 94. Another sprocket 188 on the central drive shaft 174 engages a drive chain 118 which operatively engages the sprocket 116 on the hub portion 108 of the squirrel cage assembly 96.

Although it is believed that the foregoing provides a full description of the apparatus 10, for a more complete understanding of the invention, a brief discussion of the operation will be provided. In operation, an operator, stationed at the inlet section 14, manually places unpeeled, uncut onions N, having flower and root portions thereon onto the loading wheel 28. The curved finger 46 is withdrawn from the V-shaped walls 40, the onion is inserted into the V section, and the curved finger 46 holds the onion N in place on each product receiving element 38, as each is moved to the cutting and transfer section 16. The loading wheel 18, as viewed in FIG. 1, rotates in a counterclockwise direction as does the rotary transfer arm 50.

As the onions N are moved toward the cutting and transfer section 16, the large rotary saw blades 52 intersect the onions and sever the flower and root portions from the onions as they are carried into the path of the rotating blades 52. The onions N are held in place between the rotary saw blades 52 and are pivoted or moved in a counterclockwise direction around the hub portion 70 of the saw blade assembly 68 toward the peeling section 18. During and simultaneously with this transferring movement, the outer periphery of each onion is severed to a predetermined depth of penetration by the pair of scribe blades 66. The depth of penetration is sufficient to effect later peeling of the onion.

The transfer arm 50 carries the onion N around to the peeling section, until the path of travel is intercepted by the stationary take-off rails 86 and the onions N are moved down to the outer periphery of the squirrel cage assembly 96 and the paddles 106 of the paddle blade assembly 94 transfer the onions N from the cutting and transfer section 16 to the discharge section 20. During the transferring movement, the onions N are simultaneously rotated about their own axis by the outer periphery of the squirrel cage 96 and compressed air is directed against their outer periphery from the nozzles of the discharge tubes 136. The compressed air acting at various places in the path of travel of the onions N forces the three sections of skin from the onion, which is held in place on the squirrel cage between the side rails 130. The paddles of the paddle blade assembly 94 carry the onions N to the discharge rails 138 which intercept the path of travel and the onions are carried downwardly to a belt conveyor 142 where the peeled onions, with their flower and root portions removed, are carried for further processing, such as slicing and ultimate separation into onion rings.

While in the foregoing, there has been provided a detailed description of a particular embodiment of the present invention, it is to be understood that all equivalents obvious to those skilled in the art are to be included within the scope of the invention as claimed.

What I claim and desire to secure by Letters Patent is:

1. The apparatus for peeling onions having flower and root portions, said apparatus comprising in combination, a frame, spaced cutting means on said frame for simultaneously severing the flower and root portions from said onions, means mounted on said frame intermediate said spaced knife means for scribing said onions to a preselected depth of penetration intermediate the cut ends of said onions, means for rotating said onions about their longitudinal axes, means for forcibly driving the scribed layers of said onions therefrom during said rotating movement thereby peeling said onions, and means for continuously conveying said onions in a path of travel from an inlet position for said onions to an outlet position and through said cutting means, said scribing means, said rotating means, and said drive means.

2. The apparatus of claim 1 including inlet conveyor means comprising a rotating wheel having a plurality of onion receiving means in the outer periphery thereof.

3. The apparatus of claim 2 wherein said receiving means comprises a rigid holder for receiving an onion, and spring biased means for engaging and holding said onion against said rigid holder.

4. The apparatus of claim 2 wherein said inlet conveyor includes means for positively holding each of said onions in place thereon, and said severing means comprises a pair of rotary cutters constructed and arranged to sever the flower and root portions from said onion in a direction transverse to the longitudinal axis of the said onions, said rotary cutters being spaced from each other a distance greater than the width of the said receiving means for the said onion on said inlet conveyor.

5. The apparatus of claim 1 wherein said cutting means comprises a pair of spaced rotary cutters constructed and arranged to completely sever the flower and root portions from said onions.

6. The apparatus of claim 1 including an inlet conveyor comprising rotating wheel means, said severing means comprises a rotary cutter means, said conveying means includes a rotary arm for carrying said onions through said scribing means and to said rotary means, said rotary arm and said rotating wheel means being rotatable in the same direction and said rotary cutting means being rotatable in a direction opposite that of said arm and said wheel.

7. The apparatus of claim 1 wherein said conveying means includes a rotating arm which engages said onions as the flower and root portions are severed therefrom and then transfers said severed onions in a rotary motion to said rotating means and said driving means.

8. The apparatus of claim 1 including an inlet conveyor means comprising a rotary wheel having onion holding means mounted on the outer periphery thereof, said severing means comprises a rotary cutter means spaced apart a distance greater than said holding means and said conveying means includes a rotary arm spaced intermediate said rotary cutters and of a thickness which is constructed and arranged to engage the outer periphery of each of said onions after the flower and root portions have been severed therefrom.

9. The apparatus of claim 8 wherein said rotary cutter means and said rotary arm rotate in opposite directions and are coaxial with each other.

10. The apparatus of claim 1 wherein the said scribing means comprises a pair of rotary cutters constructed and arranged to penetrate the outer periphery of said onions to said preselected depth of penetration only.

11. The apparatus of claim 1 wherein said scribing means comprises rotary cutters adapted to penetrate the outer skin of said onion to a limited depth of penetration, said severing means comprises a pair of spaced rotary cutters, spaced outwardly of and at a distance greater than the distance between said scribing cutters, said scribing cutters and said severing cutter means being coaxial and rotate in the same direction, and an inlet conveyor is provided and comprises a rotary wheel rotating in a direction opposite that of said scribing means and said severing means.

12. The apparatus of claim 11 wherein said conveying means includes an arm which engages said onions after the severing of their root and flower portions and causes the outer periphery of said onion to move against said scribing cutters to penetrate the outer periphery of said onions to said preselected depth of penetration, at least two of said scribing cutters being provided.

13. The apparatus of claim 1 wherein said driving means includes blower means directed against the outer periphery of said onions to cause the peeling thereof.

14. The apparatus of claim 1 wherein said conveying means comprises rotary conveying means for receiving and moving said severed and scribed onions and said driving means includes means for blowing pressurized air on the outer periphery of said onions for forcing the peels therefrom.

15. The apparatus of claim 14 including a discharge portion and fixed means are provided on said frame for intercepting the path of travel of said peeled onion on said conveying means for directing said onions to a discharge portion of said frame.

16. The apparatus of claim 1 including an inlet conveyor, said conveying means includes a rotary arm to move said onions through said scribing means and said severing means and said scribing means are rotary and rotate in a direction opposite the direction of said inlet conveyor and of said conveying means.

17. The apparatus of claim 1 wherein said driving means includes a blower which is directed against the outer periphery of said onions as they are being moved by said rotating means.

* * * * *